(12) United States Patent
Kakishima et al.

(10) Patent No.: US 10,020,855 B2
(45) Date of Patent: Jul. 10, 2018

(54) USER EQUIPMENT AND BASE STATION

(71) Applicant: NTT DOCOMO, INC., Tokyo (JP)

(72) Inventors: Yuichi Kakishima, Tokyo (JP); Satoshi Nagata, Tokyo (JP); Chongning Na, Beijing (CN); Yang Song, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/513,037

(22) PCT Filed: Sep. 16, 2015

(86) PCT No.: PCT/JP2015/076306
§ 371 (c)(1),
(2) Date: Mar. 21, 2017

(87) PCT Pub. No.: WO2016/047527
PCT Pub. Date: Mar. 31, 2016

(65) Prior Publication Data
US 2017/0302345 A1    Oct. 19, 2017

(30) Foreign Application Priority Data
Sep. 25, 2014    (JP) ................................. 2014-195886

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0417* (2013.01); *H04B 7/0452* (2013.01)

(58) Field of Classification Search
CPC ... H04B 7/0456; H04B 7/0417; H04B 7/0452
See application file for complete search history.

(56) References Cited

U.S. PATENT DOCUMENTS

2013/0265899 A1*  10/2013  Sayana ................. H04W 24/00
                                                    370/252
2013/0308715 A1*  11/2013  Nam ..................... H04B 7/0469
                                                    375/267

(Continued)

FOREIGN PATENT DOCUMENTS

| JP | 2012-514411 A | 6/2012 |
| WO | 2013/024351 A1 | 2/2013 |
| WO | 2013/151357 A1 | 10/2013 |

OTHER PUBLICATIONS

International Search Report issued in corresponding application No. PCT/JP2015/076306 dated Oct. 20, 2015 (4 pages).

(Continued)

Primary Examiner — Syed Haider
(74) Attorney, Agent, or Firm — Osha Liang LLP

(57) ABSTRACT

User equipment for implementing 3D MIMO (3-Dimensional Multiple-Input Multiple-Output) communication includes: a transmission and reception unit configured to transmit and receive radio signals to/from a base station in the 3D MIMO communication; and a codebook management unit configured to have a first codebook and a second codebook. The codebook management unit determines a 3D codebook for the 3D MIMO communication by combining the first codebook with the second codebook, and the transmission and reception unit feeds the first codebook and the second codebook serving as a basis of calculating the determined 3D codebook back to the base station.

8 Claims, 11 Drawing Sheets

V-Codebook ⊗ H-Codebook = 3D-Codebook $R_V=2$ ⊗ $R_H=3$ = R=4

| | V-Codebook column | H-Codebook column |
|---|---|---|
| Selected | 1 | 1 |
| Selected | 2 | 1 |
| Selected | 1 | 2 |
| Selected | 2 | 2 |
| Selected | 1 | 3 |
| Not selected | 2 | 3 |

(51) Int. Cl.
*H04B 7/0452* (2017.01)
*H04B 7/0417* (2017.01)

(56) References Cited

U.S. PATENT DOCUMENTS

| | | | | |
|---|---|---|---|---|
| 2014/0198869 | A1* | 7/2014 | Melzer | H04B 7/0417 375/267 |
| 2015/0280884 | A1* | 10/2015 | Choi | H04L 25/0391 370/329 |
| 2016/0149630 | A1* | 5/2016 | Liu | H04B 7/0417 370/329 |

OTHER PUBLICATIONS

Written Opinion of the International Searching Authority issued in corresponding application No. PCT/JP2015/076306 dated Oct. 20, 2015 (4 pages).

3GPP TS 36.213 V12.2.0, "3rd Generation Partnership Project; Technical Specification Group Radio Access Network; Evolved Universal Terrestrial Radio Access (E-UTRA); Physical layer procedures (Release 12)"; Jun. 2014 (207 pages).

3GPP TR 37.840 V12.1.0, "3rd Generation Partnership Project; Technical Specification Group Radio Access Network; Study of Radio Frequency (RF) and Electromagnetic Compatibility (EMC) requirements for Active Antenna Array System (AAS) base station (Release 12)"; Dec. 2013 (84 pages).

* cited by examiner

PRIOR ART

V-Codebook ⊗ H-Codebook = 3D-Codebook

|  | V-Codebook column | H-Codebook column |
|---|---|---|
| Selected | 1 | 1 |
| Selected | 2 | 1 |
| Selected | 1 | 2 |
| Selected | 2 | 2 |
| Selected | 1 | 3 |
| Not selected | 2 | 3 |

USER EQUIPMENT AND BASE STATION

TECHNICAL FIELD

The present invention relates to a radio communication system.

BACKGROUND ART

In addition to conventional horizontal beam control, 3D MIMO (Third Dimensional Multiple-Input Multiple-Output) for performing vertical beam control is being presently discussed. The 3D MIMO is sometimes classified into elevation beamforming (BF) and full dimension (FD)-MIMO depending on the number of antenna ports. As illustrated in FIG. 1, the 3D MIMO with up to eight antenna ports is referred to as the elevation beamforming, and the 3D MIMO with more antenna ports is referred to as the full dimension-MIMO or massive MIMO. In the full dimension-MIMO, as illustrated, not only two dimensional planar antennas having a large number of antenna ports but also three dimensional antennas, such as cylindrically arranged antennas and antennas arranged on surfaces of a cube, are used.

In the 3D MIMO where a base station having such multi-dimensional antennas controls beams in the two directions, that is, the horizontal direction and the vertical direction, active antenna system (AAS) based operations, where calibration is performed to form accurate beams in the vertical direction in consideration of impacts on inter-cell interference, are assumed. In Release 13 of LTE (Long Term Evolution) specifications, it is assumed that up to 64 transceiver units (TXRUs) are used, and these transceiver units are controlled under the active antenna system.

Effects of the 3D MIMO are as follows. First, a higher beam forming gain can be achieved by implementing the vertical beam control (precoding) in addition to the conventional horizontal direction. For example, as illustrated in FIG. 2, beams can be blown up toward user equipments in tall buildings. Also, the higher beam forming gain can be achieved with a larger number of antennas. For example, sharpened beams make it possible to transmit radio signals to targeted user equipment at higher transmission power as well as to reduce interference power from other beams. Furthermore, by using a huge amount of antenna elements, a transmission diversity gain can be achieved, and interference control and traffic offloading can be implemented with flexible beam control.

Antennas for use in the 3D MIMO typically have an arrangement as illustrated in FIG. 3. Specifically, V×H antenna elements are grouped into multiple subarrays. The illustrated subarrays are composed of vertically arranged antenna elements, but are not limited to it, and may be composed of horizontally or two-dimensionally or three-dimensionally arranged antenna elements. Also, the subarrays may not be necessarily composed of successive antenna elements. In general, the number of subarrays is the same as the number of TXRUs but is not necessarily limited to it. In cases where a single subarray is composed of one antenna element (K=1), the best transmission characteristics can be achieved, but more TXRUs are needed, which may increase workload of an associated baseband (BB) processing unit. Here, fixed tilt may be sometimes applied to antenna elements in the subarrays. Also, in the illustrated 3D MIMO antennas, single polarization antennas are used, but are not limited to it, and orthogonal polarization antennas may be used.

In the full dimension-MIMO or the massive MIMO, beam tracking error has a significant impact due to sharpened beams, which may result in holes in coverage. For this reason, appropriate beam forming is important, and various beam forming schemes are discussed. In other words, in the 3D MIMO, it has to be defined how a base station transmits reference signals for channel state measurement from multiple antenna ports and how user equipment feeds the measured channel state back.

See 3GPP TR 37.840 V12.1.0 (2013-12) and 3GPP TS 36.213 V12.2.0 (2014-06) for further details, for example.

SUMMARY OF INVENTION

Problem to Be Solved By the Invention

In the conventional LTE specifications, codebooks are defined corresponding to antenna arrangements. For example, as illustrated in FIG. 4, 2-TX and 4-TX codebooks for single polarization antenna arrays are defined in Release 8. Also, in Release 10, 8-TX codebooks for cross polarization antenna arrays are defined. Furthermore, in Release 12, 4-TX codebooks for cross polarization antenna arrays are defined.

Meanwhile, in Release 13, it is assumed that codebooks for the above-stated 3D MIMO will be discussed. For the codebooks in up to Release 12, only the codebooks for up to the 8-TX antenna arrays have been discussed, and only one-dimensional antenna arrays, where antenna ports are typically arranged in the horizontal direction, are supported. As a result, codebooks suitable for 3D MIMO antenna arrays having more than 8 two-dimensionally arranged antenna ports are required.

An object of the present invention is to provide codebooks for 3D MIMO communication.

Means for Solving the Problem

In order to achieve the above object, one aspect of the present invention relates to user equipment for implementing 3D MIMO communication, comprising: a transmission and reception unit configured to transmit and receive radio signals to/from a base station in the 3D MIMO communication; and a codebook management unit configured to have a first codebook and a second codebook, wherein the codebook management unit determines a 3D codebook for the 3D MIMO communication by combining the first codebook with the second codebook, and the transmission and reception unit feeds the first codebook and the second codebook serving as a basis of calculating the determined 3D codebook back to the base station.

Another aspect of the present invention relates to a base station for implementing 3D MIMO communication, comprising: a transmission and reception unit configured to transmit and receive radio signals to/from user equipment in 3D MIMO communication; and a codebook management unit configured to have a first codebook and a second codebook, wherein the codebook management unit determines a 3D codebook for the 3D MIMO communication by combining the first codebook with the second codebook based on feedback information received from the user equipment.

Advantage of the Invention

According to the present invention, codebooks for 3D MIMO communication can be provided.

EMBODIMENTS OF THE INVENTION

Embodiments of the present invention are described below with reference to the drawings.

In embodiments as stated below, user equipment and a base station for implementing 3D MIMO communication are disclosed. Summarizing the embodiments below, 3D codebooks for the 3D MIMO communication are generated from two types of codebooks, that is, vertical codebooks for vertical precoding and horizontal codebooks for horizontal precoding. In this case, the user equipment and the base station must share knowledge as to how the user equipment selects two types of feedback information and what type of three-dimensional beams the base station reconstructs based on the two types of feedback information. As one aspect, 3D codebooks can be generated by applying a Kronecker product to the two types of codebooks. Note that the two types of codebooks, that is, the vertical and horizontal codebooks, are assumed in the present example, but three types of codebooks including polarization codebooks may be used, or the polarization dimension may be included in either the vertical dimension or the horizontal dimension. Based on reference signals (CSI-RSs) transmitted from the base station, the user equipment calculates the Kronecker product of a vertical precoder and a horizontal precoder to generate a 3D codebook with a desired rank. If the number of columns of the calculated Kronecker product is equal to the desired rank, the user equipment uses the calculated Kronecker product as the 3D codebook. On the other hand, in cases where the total spatial multiplexing number is a prime number, there may be no selectable precoder candidate or may be a limited number of selectable precoder candidates. In these cases, for example, it is accepted that the number of columns in the calculated Kronecker product is greater than the desired rank, and the user equipment can generate the 3D codebook by deleting the number of columns corresponding to the difference from the calculated Kronecker product. Similarly, the base station also generates the selected 3D codebook based on feedback information regarding generation of the selected 3D codebook and uses the selected 3D codebook to perform 3D MIMO communication with the user equipment. By combining the vertical codebook with the horizontal codebook in this manner, the same 3D codebook can be efficiently acquired and used by the user equipment and the base station.

Figure 1:
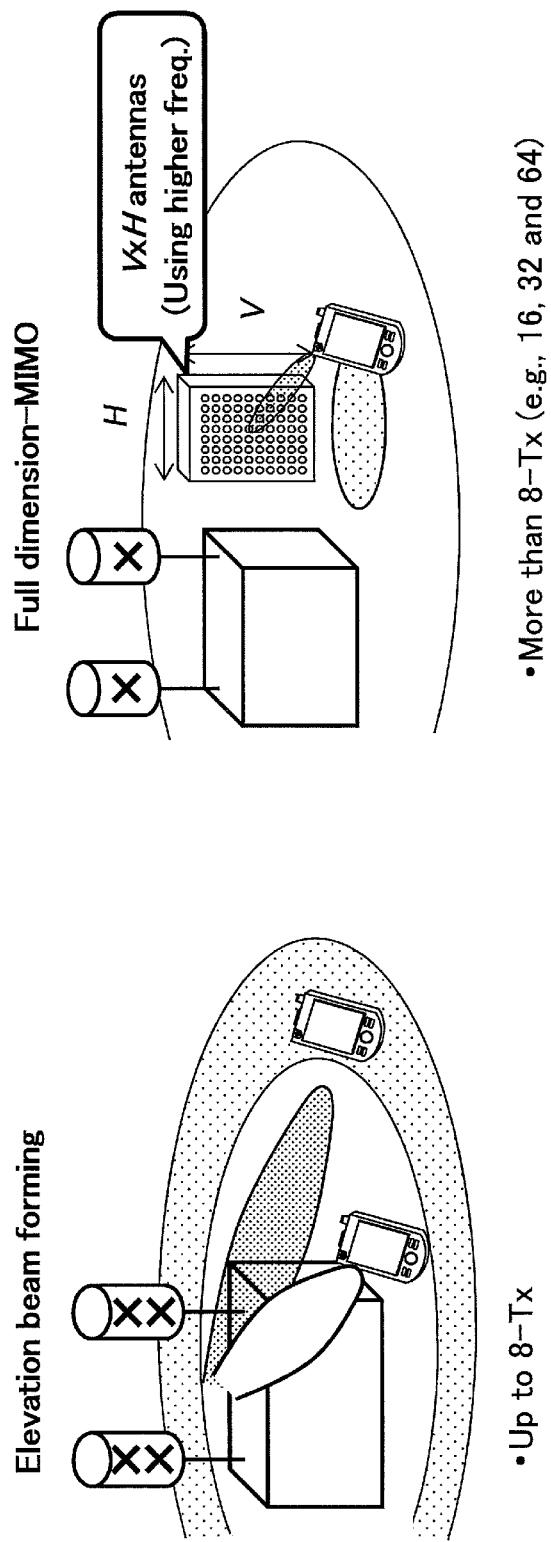
FIG. 1 is a schematic diagram for illustrating antenna types for 3D MIMO.
Figure 2:
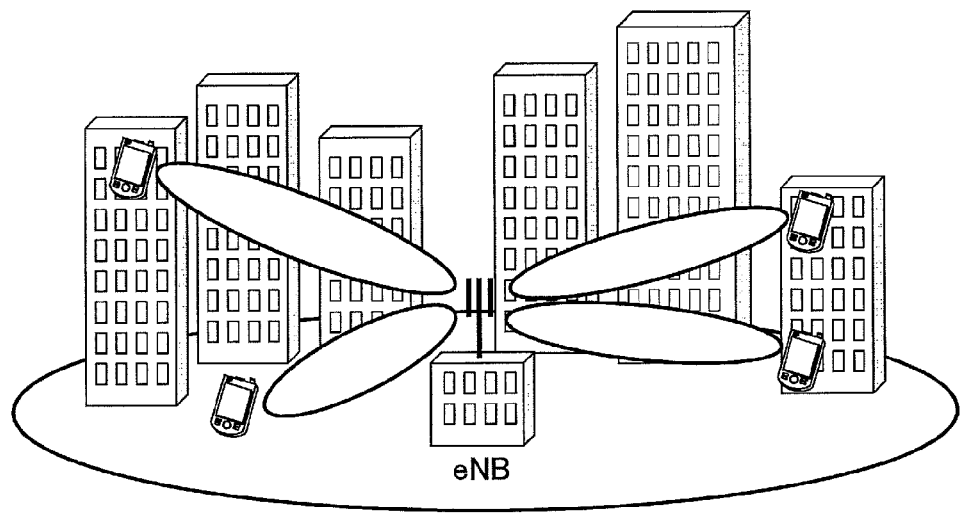
FIG. 2 is a schematic diagram for illustrating beam control in the 3D MIMO.
Figure 3:
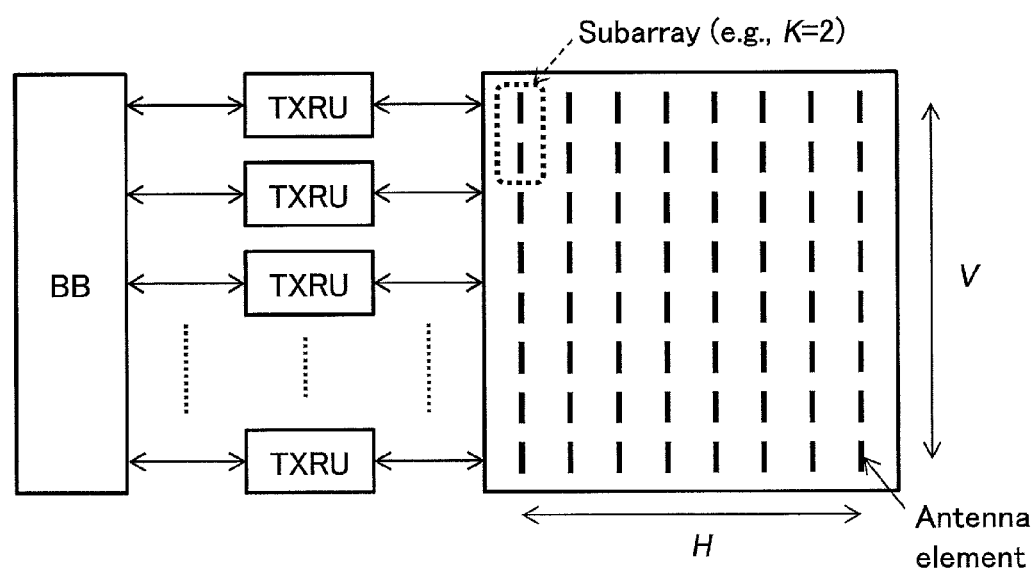
FIG. 3 is a schematic diagram for illustrating an exemplary 3D MIMO antenna arrangement.
Figure 4:
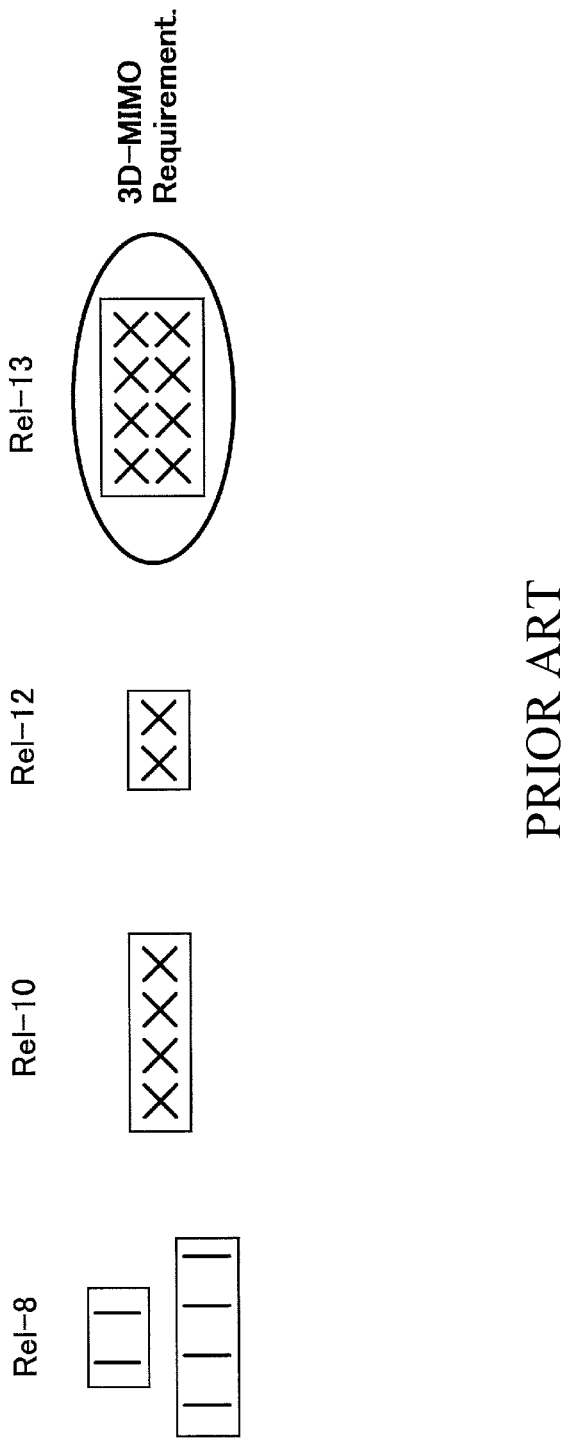
FIG. 4 is a diagram for illustrating antenna arrangements defined in respective releases in the LTE specification.
Figure 5:
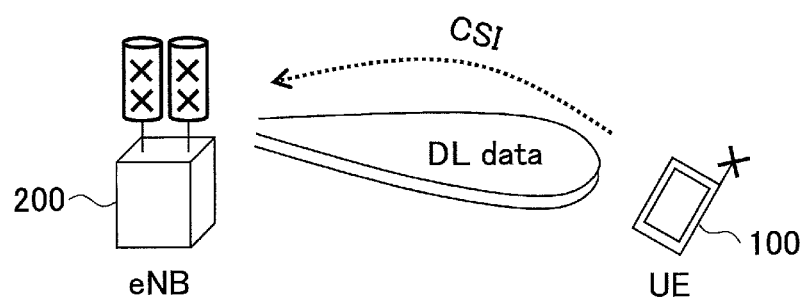
FIG. 5 is a schematic diagram for illustrating a radio communication system according to one embodiment of the present invention.

At the outset, a radio communication system according to one embodiment of the present invention is described with reference to FIG. 5. FIG. 5 is a schematic diagram for illustrating a radio communication system according to one embodiment of the present invention.

As illustrated in FIG. 5, the radio communication system 10 has user equipment 100 and a base station 200. The radio communication system 10 is an LTE system or an LTE-Advanced (LTE-A) system, but is not limited to it, and may be any radio communication system that supports 3D MIMO communication.

The user equipment 100 implements the 3D MIMO communication with the base station 200 and transmits and receives radio signals such as various data signals and control signals to/from the base station 200 via multiple antenna ports of the base station 200. In order to implement appropriate 3D MIMO communication, the user equipment 100 estimates channel states with respective antenna ports and feeds the estimated channel states as channel state information (CSI) back to the base station 200. Upon receiving the channel state information, the base station 200 controls beams transmitted from the respective antenna ports based on the received channel state information.

The user equipment 100 may be typically any appropriate information processing device having a radio communication function such as a smartphone, a cellular phone, a tablet, a mobile router and a wearable terminal. The user equipment 100 is composed of a CPU (Central Processing Unit) such as a processor, a memory device such as a RAM (Random Access Memory) and a flash memory, a radio communication device for transmitting and receiving radio signals to/from the base station 200 and the like. For example, functions and operations of the user equipment 100 as stated below may be implemented by the CPU processing or running data and/or programs stored in the memory device. However, the user equipment 100 is not limited to the above-stated hardware arrangement and may be composed of circuits or the like for implementing one or more of the operations as stated below.

The base station 200 implements 3D MIMO communication with the user equipment 100 and wirelessly connects for the user equipment 100 via multiple antenna ports in incorporated multi-dimensional antennas such as two-dimensional planar antennas and three-dimensional antennas. Specifically, the base station 200 transmits downlink (DL) packets received from a network device such as an upper station and a server communicatively connected to a core network (not shown) to the user equipment 100 via multiple antenna ports and transmits uplink (UL) packets received from the user equipment 100 via the multiple antenna ports to the network device.

The base station 200 is typically composed of hardware resources such as 3D MIMO antennas for transmitting and receiving radio signals to/from the user equipment 100, communication interfaces for communicating with adjacent base stations 200 (for example, an X2 interface), communication interfaces for communicating with the core network (for example, an S1 interface) and a processor or circuit for processing transmission and reception signals with the user equipment 100. Functions and operations of the base station 200 as stated below may be implemented by the processor processing or running data and/or programs stored in a memory device. However, the base station 200 is not limited to the above-stated hardware arrangement and may have any other appropriate hardware arrangement. In general, a large number of base stations 200 are disposed to cover a service area of the radio communication system 10.

Figure 6:
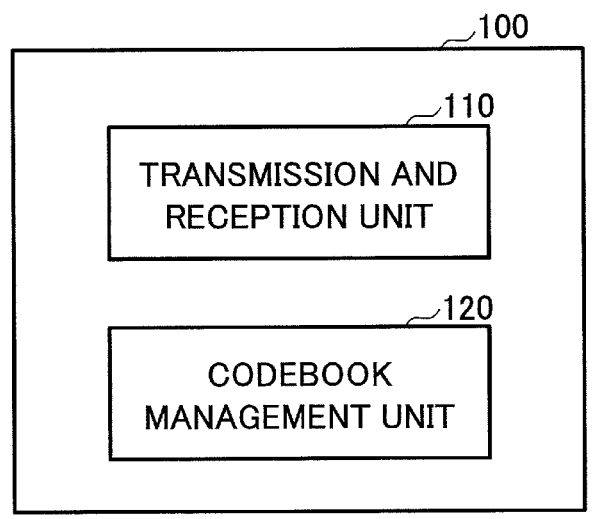
FIG. 6 is a block diagram for illustrating an arrangement of user equipment according to one embodiment of the present invention.

Next, user equipment according to one embodiment of the present invention is described with reference to FIGS. 6-12. FIG. 6 is a block diagram for illustrating an arrangement of the user equipment according to one embodiment of the present invention.

As illustrated in FIG. 6, the user equipment 100 has a transmission and reception unit 110 and a codebook management unit 120.

The transmission and reception unit 110 transmits and receives radio signals to/from the base station 200 in 3D MIMO communication. Specifically, in downlink communication, the transmission and reception unit 110 uses horizontally and vertically controlled beams to receive downlink radio signals transmitted from multiple antenna ports in the base station 200 and uses a codebook for use in the beam control to demodulate the received radio signals. Also, in uplink communication, the transmission and reception unit 110 uses the codebook to transmit uplink radio signals to the base station 200.

In order to implement the 3D MIMO communication, an appropriate codebook has to be selected, and the user equipment 100 receives a reference signal (Channel State Information-Reference Signal: CSI-RS) for measuring channel states transmitted from the respective antenna ports in the base station 200 and estimates the channel states with the base station 200 based on the received reference signals to select the appropriate codebook. The transmission and reception unit 110 determines a precoding matrix indicator (PMI), a rank indicator (RI) and a channel quality indicator (CQI) based on the estimated channel states and feeds them as channel state information (CSI) back to the base station 200.

The codebook management unit 120 has a first codebook and a second codebook and determines a 3D codebook for the 3D MIMO communication by combining the first codebook with the second codebook. In one embodiment, the first codebook is a vertical codebook for vertical precoding, and the second codebook is a horizontal codebook for horizontal precoding, and the codebook management unit 120 may calculate a Kronecker product of the vertical codebook and the horizontal codebook to determine the 3D codebook for the 3D MIMO communication from the calculated Kronecker product. Note that the first and second codebooks are not limited to the vertical codebook and the horizontal codebook and a polarization direction for a cross polarization antenna may be included, for example. The codebook management unit 120 may generate the 3D codebook by combining any two or more of the vertical direction, the horizontal direction and the polarization direction. Also, operations to combine the two codebooks according to the present invention are not limited to the Kronecker product and may be any appropriate binary operations or matrix operations to combine the two or more codebooks (matrices).

Here, the Kronecker product is a binary operation defined for two matrices having arbitrary sizes. Specifically, the Kronecker product of a matrix $A=(a_{ij})$ having m×n and a matrix $B=(b_{kl})$ having p×q is $$A \otimes B = \begin{pmatrix} a_{11}B & \ldots & a_{1n}B \\ \vdots & \ddots & \vdots \\ a_{m1}B & \ldots & a_{mn}B \end{pmatrix},$$

and more specifically is $$\begin{pmatrix} a_{11}b_{11} & a_{11}b_{12} & \ldots & a_{11}b_{1q} & \ldots & \ldots & a_{1n}b_{11} & a_{1n}b_{12} & \ldots & a_{1n}b_{1q} \\ a_{11}b_{21} & a_{11}b_{22} & \ldots & a_{11}b_{2q} & \ldots & \ldots & a_{1n}b_{21} & a_{1n}b_{22} & \ldots & a_{1n}b_{2q} \\ \vdots & \vdots & \ddots & \vdots & & & \vdots & \vdots & \ddots & \vdots \\ a_{11}b_{p1} & a_{11}b_{p2} & \ldots & a_{11}b_{pq} & \ldots & \ldots & a_{1n}b_{p1} & a_{1n}b_{p2} & \ldots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \ldots & a_{m1}b_{1q} & \ldots & \ldots & a_{mn}b_{11} & a_{mn}b_{12} & \ldots & a_{mn}b_{1q} \\ a_{m1}b_{21} & a_{m1}b_{22} & \ldots & a_{m1}b_{2q} & \ldots & \ldots & a_{mn}b_{21} & a_{mn}b_{22} & \ldots & a_{mn}b_{2q} \\ \vdots & \vdots & \ddots & \vdots & & & \vdots & \vdots & \ddots & \vdots \\ a_{m1}b_{p1} & a_{m1}b_{p2} & \ldots & a_{m1}b_{pq} & \ldots & \ldots & a_{mn}b_{p1} & a_{mn}b_{p2} & \ldots & a_{mn}b_{pq} \end{pmatrix}.$$

In other words, the codebook management unit 120 determines a 3D codebook for the 3D MIMO communication from a matrix obtained as the Kronecker product $$A \otimes B$$

of the vertical codebook A and the horizontal codebook B.

Note that the Kronecker product is not generally commutative and accordingly the Kronecker product of the vertical codebook A and the horizontal codebook B is different from the Kronecker product of the horizontal codebook B and the vertical codebook A. However, the present invention is not limited to any one of them and the Kronecker product obtained in any operation order may be used as the 3D codebook.

In one embodiment, the codebook management unit 120 may calculate the Kronecker product of the vertical codebook for rank $R_V$ and the horizontal codebook for rank $R_H$ to generate the 3D codebook for rank R equal to a product $(R_V \times R_H)$ of the rank $R_V$ and the rank $R_H$. In this case, the transmission and reception unit 110 may feed a precoding matrix indicator $PMI_V$ and a rank $R_V$ for the vertical codebook, a precoding matrix indicator $PMI_H$ and a rank $R_H$ for the horizontal codebook, which serve as the basis of calculating the determined 3D codebook, and a channel quality indicator CQI derived from the 3D codebook back to the base station 200.

Figure 7:
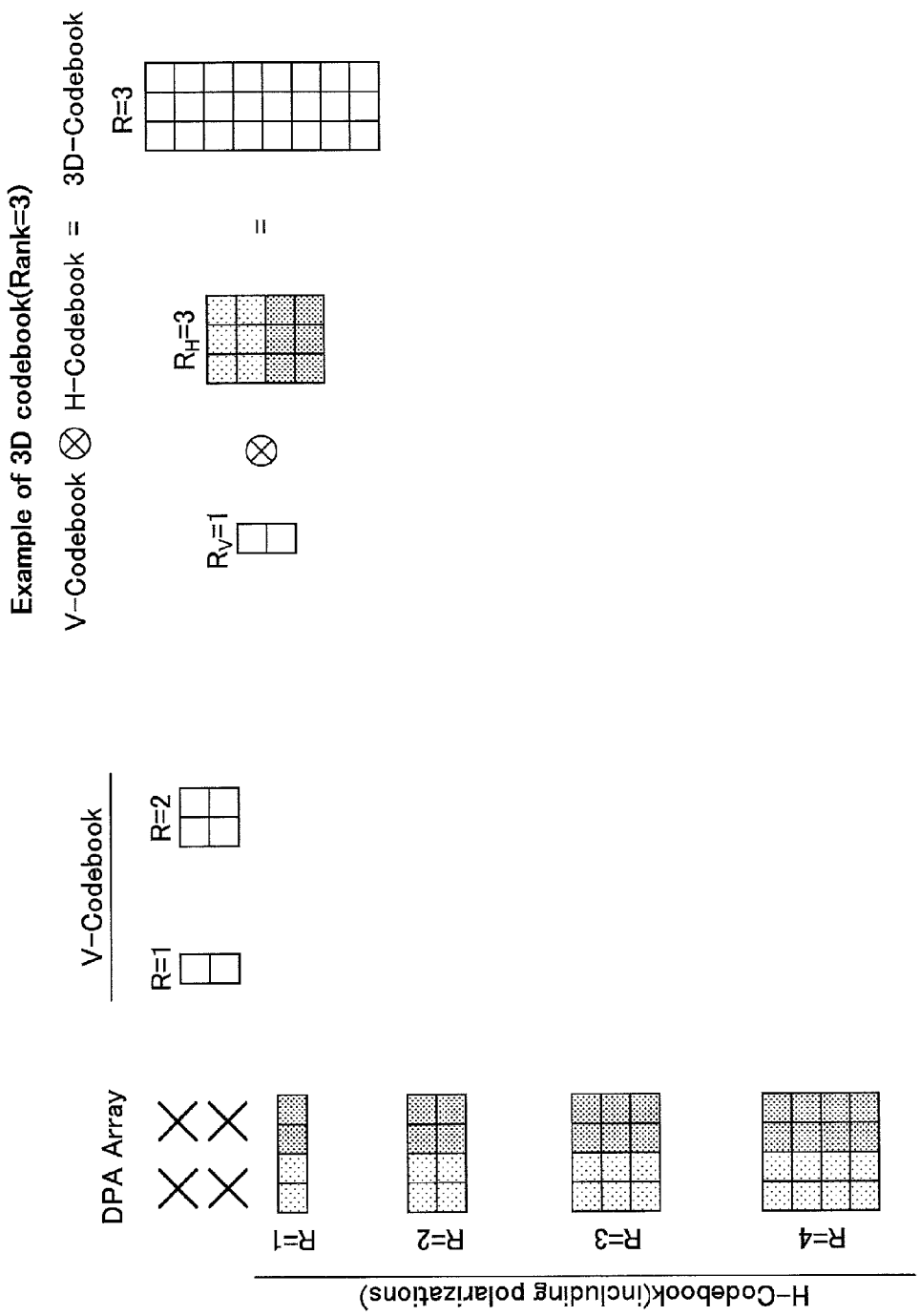
FIG. 7 is a diagram for illustrating exemplary generation of 3D codebooks according to one embodiment of the present invention.

As illustrated in FIG. 7, it is supposed that the codebook management unit 120 has two vertical codebooks for rank 1 ($R_V=1$) and rank 2 ($R_V=2$) and four horizontal codebooks for ranks 1-4 ($R_H=1$-4). Then, in order to generate a 3D codebook for rank 3 (R=3), the codebook management unit 120 may calculate the Kronecker product of the vertical codebook for $R_V=1$ and the horizontal codebook for $R_H=3$ and use the calculated Kronecker product as the 3D codebook for R=3. The transmission and reception unit 110 derives the CQI from the generated 3D codebook and feeds the $PMI_V$ and $R_V$ for the vertical codebook and the $PMI_H$ and $R_H$ for the horizontal codebook together with the derived CQI as channel state information (CSI) back to the base station 200. Upon receiving the CSI, the base station 200 can derive the 3D codebook selected by the user equipment 100 from the $PMI_V$ and $PMI_H$, and the user equipment 100 and the base station 200 can implement the subsequent 3D MIMO with the same 3D codebook.

Figure 8:
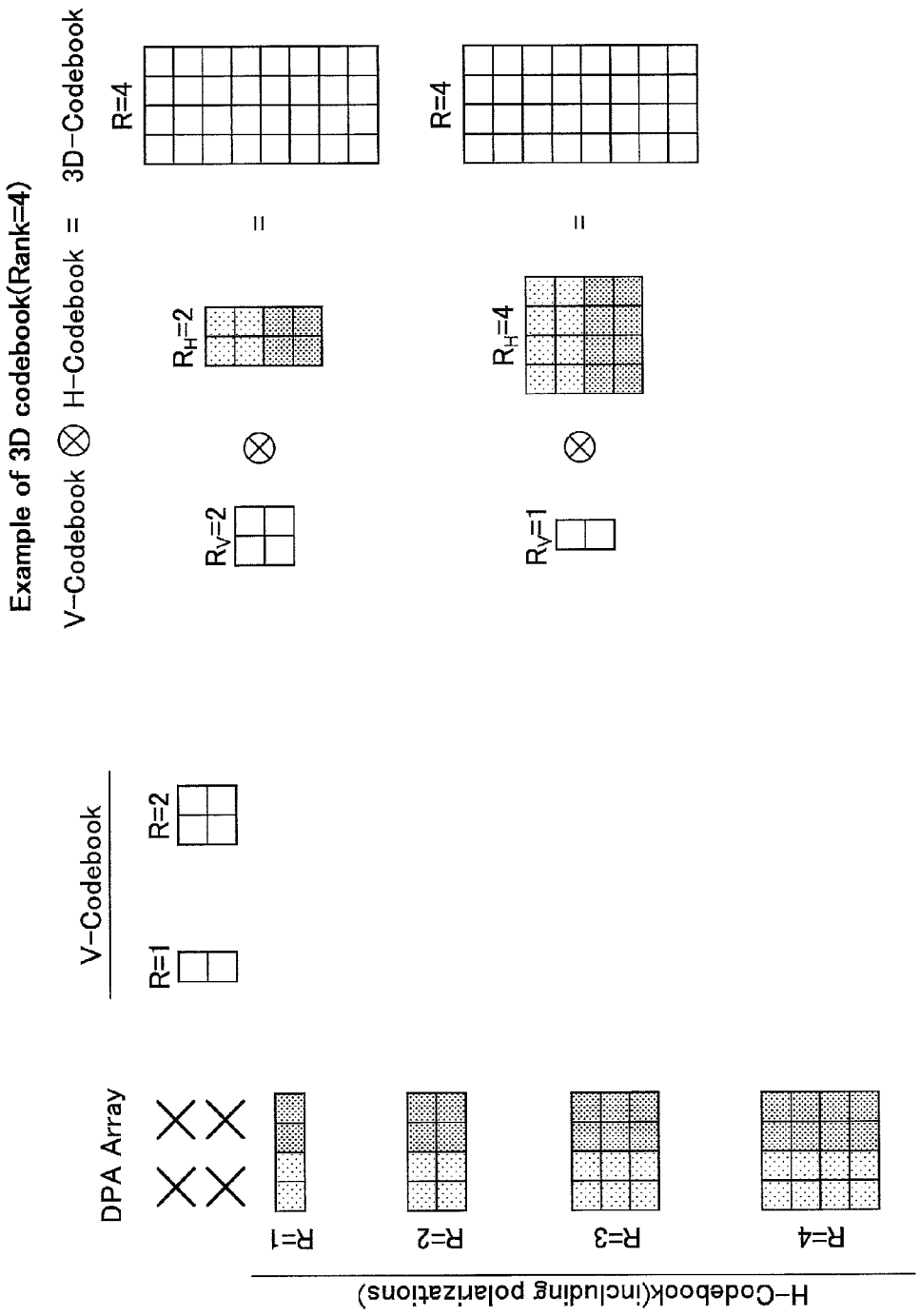
FIG. 8 is a diagram for illustrating exemplary generation of 3D codebooks according to one embodiment of the present invention.

Similarly, as illustrated in FIG. 8, the codebook management unit 120 can use two combinations of the Kronecker product of the vertical codebook for $R_V=2$ and the horizontal codebook for $R_H=2$ and the Kronecker product of the vertical codebook for $R_V=1$ and the horizontal codebook for $R_H=4$. The codebook management unit 120 may calculate these Kronecker products and use the calculated Kronecker products as the 3D codebooks for R=3. For example, the transmission and reception unit 110 may derive respective CQIs from the 3D codebooks generated from the two Kronecker products and select the 3D codebook, which can achieve a higher one of the CQIs, as the 3D codebook for feedback. The transmission and reception unit 110 feeds the $PMI_V$ and $R_V$ of the vertical codebook and the $PMI_H$ and $R_H$ of the horizontal codebook, which serve as a basis of calculating the selected 3D codebook, together with the derived CQIs as the channel state information (CSI) back to the base station 200. Upon receiving the CSI, the base station 200 can derive the 3D codebook selected by the user equipment 100 from the $PMI_V$ and $PMI_H$, and the user equipment 100 and the base station 200 can achieve the subsequent 3D MIMO communication with the same 3D codebook.

Also, in other embodiments, the codebook management unit 120 may calculate the Kronecker product of the vertical codebook for rank $R_V$ and the horizontal codebook for rank $R_H$ to generate the 3D codebook for rank R smaller than or equal to a product ($R_V \times R_H$) of the rank $R_V$ and the rank $R_H$. Specifically, the number of columns in the calculated Kronecker product is equal to $R_V \times R_H$, and if $R<R_V \times R_H$, a matrix for the Kronecker product has to be reduced to be a 3D codebook for rank R. To this end, if rank R is smaller than the product ($R_V \times R_H$) of rank $R_V$ and rank $R_H$ ($R<R_V \times R_H$), the codebook management unit 120 may generate the 3D codebook for rank R by deleting a number of columns corresponding to a difference $\{(R_V \times R_H)-R\}$ from the calculated Kronecker product. In this case, the transmission and reception unit 110 may feed the precoding matrix indicator $PMI_V$ and rank $R_V$ for the vertical codebook, the precoding matrix indicator $PMI_H$ and rank $R_H$ for the horizontal codebook, the rank R and a rank mapping index indicative of the columns deleted from the Kronecker product, which serve as a basis of calculating the determined 3D codebook, as well as the channel quality indicator CQI derived from the 3D codebook for the rank R back to the base station 200.

Figure 9:
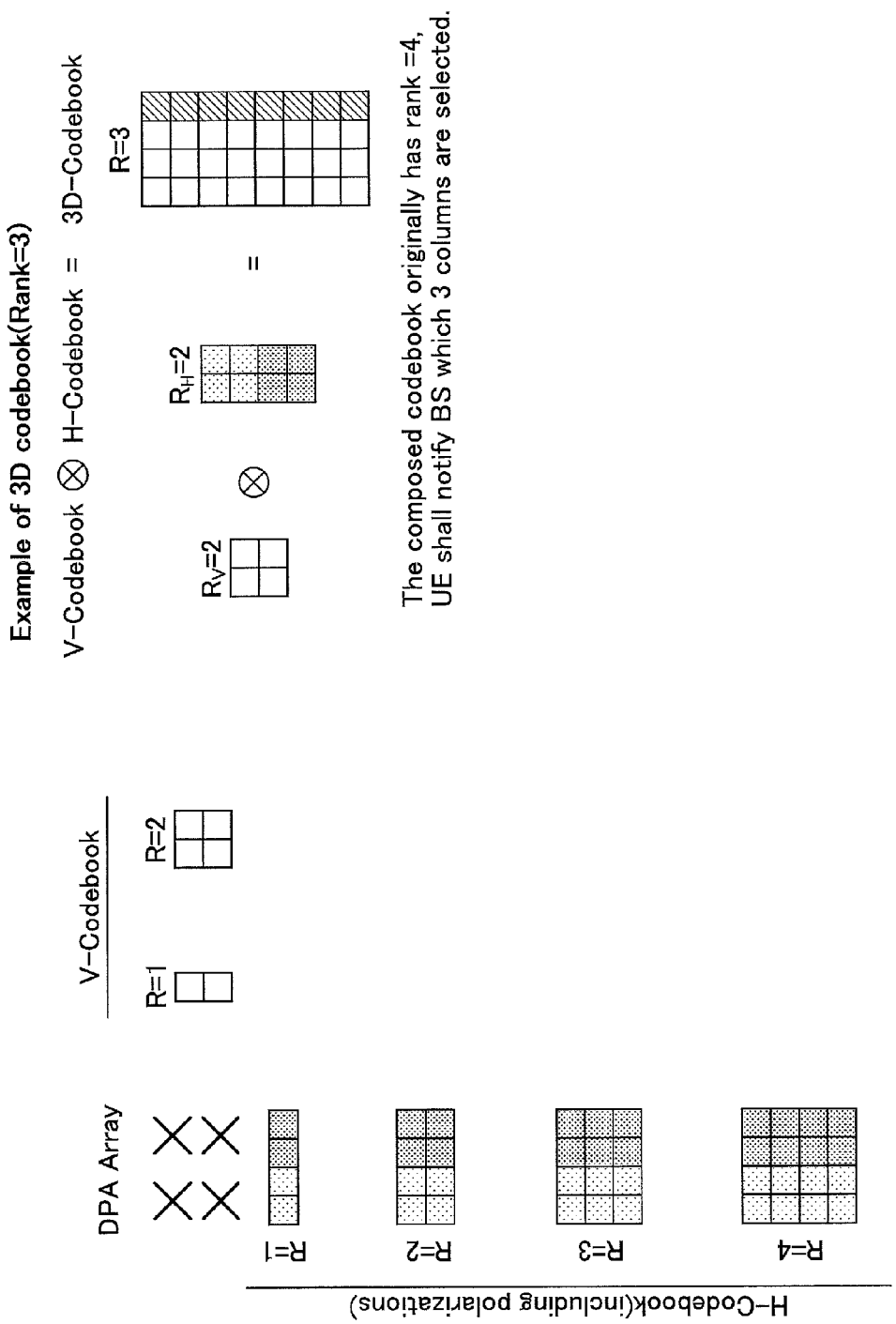
FIG. 9 is a diagram for illustrating exemplary generation of 3D codebooks according to one embodiment of the present invention.

As illustrated in FIG. 9, it is supposed that the codebook management unit 120 has two vertical codebooks for rank 1 ($R_V=1$) and rank 2 ($R_V=2$) and four horizontal codebooks for ranks 1-4 ($R_H=1$-4). Then, in order to generate a 3D codebook for rank 3 (R=3), the codebook management unit 120 may generate the 3D codebook for R=3 by calculating the Kronecker product of the vertical codebook for $R_V=2$ and the horizontal codebook for $R_H=2$ and deleting any one column (in the illustrated example, the last column in the Kronecker product) corresponding to the difference $\{(2 \times 2)-3\}$ from the calculated Kronecker product. The transmission and reception unit 110 derives the CQI from the generated 3D codebook and feeds the $PMI_V$ and $R_V$ for the vertical codebook, the $PMI_H$ and $R_H$ for the horizontal codebook, the rank R and the rank mapping index indicative of the column deleted from the Kronecker product as the channel state information (CSI) back to the base station 200. Upon receiving the CSI, the base station 200 can derive the 3D codebook selected by the user equipment 100 from the $PMI_V$, the $PMI_H$, the R and the rank mapping indicator, and the user equipment 100 and the base station 200 can achieve the subsequent 3D MIMO communication with the same 3D codebook.

Figure 10:
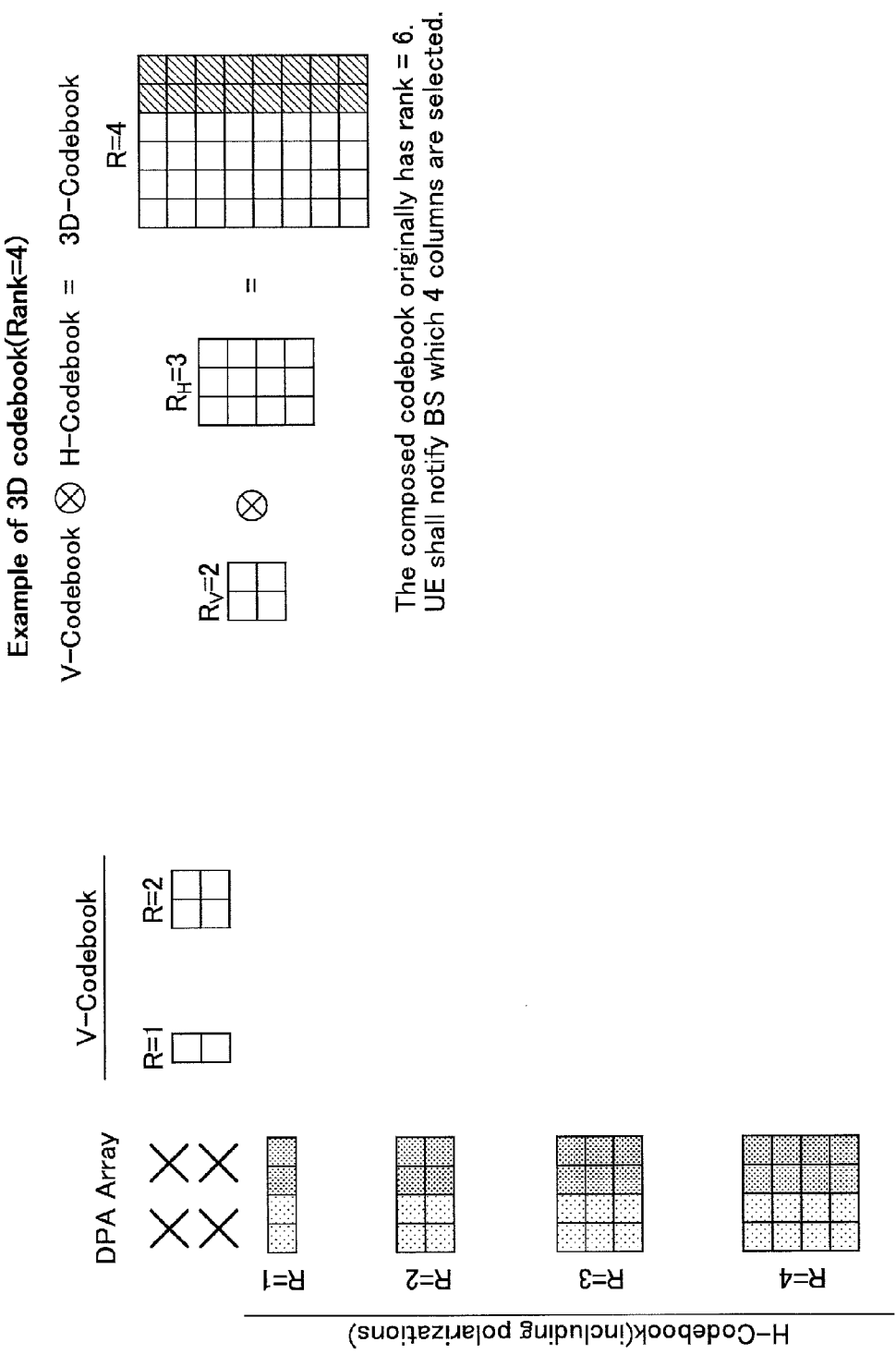
FIG. 10 is a diagram for illustrating exemplary generation of 3D codebooks according to one embodiment of the present invention.

Similarly, as illustrated in FIG. 10, in order to generate a 3D codebook for rank 4 (R=4), the codebook management unit 120 may generate the 3D codebook for R=4 by calculating the Kronecker product of the vertical codebook for $R_V=2$ and the horizontal codebook for $R_H=3$ and deleting any two columns (in the illustrated example, the last two columns in the Kronecker product) corresponding to the difference $\{(2 \times 3)-4\}$ from the calculated Kronecker product. The transmission and reception unit 110 derives the CQI from the generated 3D codebook and feeds the $PMI_V$ and $R_V$ for the vertical codebook, the $PMI_H$ and $R_H$ for the horizontal codebook, the rank R and the rank mapping indicator indicative of columns deleted from the Kronecker product together with the derived CQI as the channel state information (CSI) back to the base station 200. Upon receiving the CSI, the base station 200 can derive the 3D codebook selected by the user equipment 100 from the $PMI_V$, the $PMI_H$, the R and the rank mapping indicator, and the user equipment 100 and the base station 200 can achieve the subsequent 3D MIMO communication with the same 3D codebook.

Figure 11:
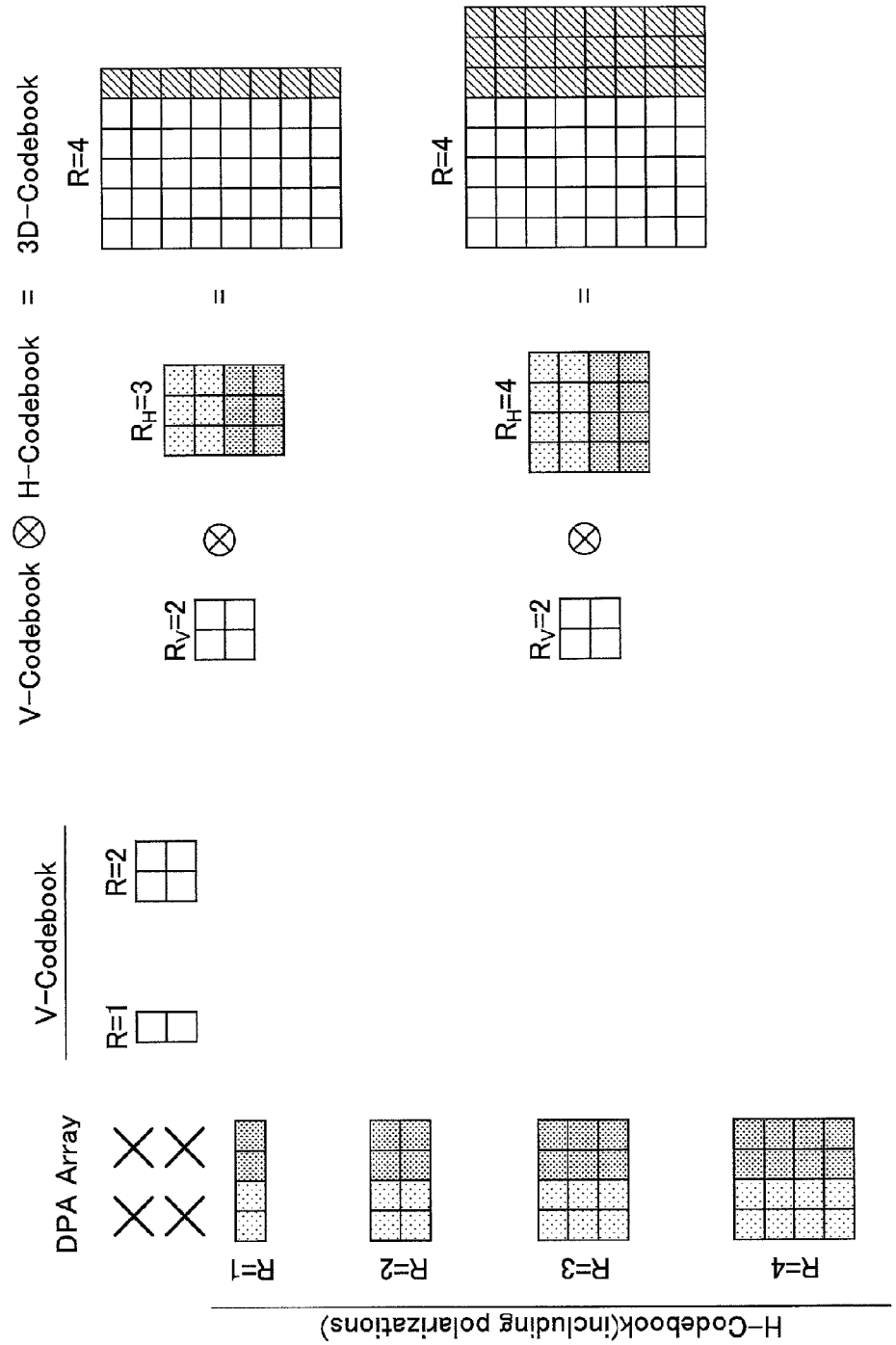
FIG. 11 is a diagram for illustrating exemplary generation of 3D codebooks according to one embodiment of the present invention.

Similarly, as illustrated in FIG. 11, the codebook management unit 120 may use two combinations of the Kronecker product of the vertical codebook for $R_V=2$ and the horizontal codebook for $R_H=3$ and the Kronecker product of the vertical codebook for $R_V=2$ and the horizontal codebook for $R_H=4$ to generate a 3D codebook for rank 5 (R=5). The codebook management unit 120 may generate the 3D codebook for R=5 by calculating the Kronecker product of the vertical codebook for $R_V=2$ and the horizontal codebook for $R_H=3$ and deleting any one column (in the illustrated example, the last column in the Kronecker product) corresponding to the difference $\{(2 \times 3)-5\}$ from the calculated Kronecker product. Also, the codebook management unit 120 may generate the 3D codebook for R=5 by calculating the Kronecker product of the vertical codebook for $R_V=2$ and the horizontal codebook for $R_H=4$ and deleting any three columns (in the illustrated example, the last three columns in the Kronecker product) corresponding to the difference $\{(2 \times 4)-5\}$ from the calculated Kronecker product. For example, the transmission and reception unit 110 may derive the respective CQIs from the 3D codebooks generated from these Kronecker products and select the 3D codebook, which achieves a higher one of the CQIs, as the 3D codebook for feedback. In this manner, the 3D codebook for rank 5, which is not supported in accordance with either the vertical codebook or the horizontal codebook alone, can be obtained by combining the vertical codebook with the horizontal codebook. The transmission and reception unit 110 feeds the $PMI_V$ and $R_V$ for the vertical codebook, the $PMI_H$ and $R_H$ for the horizontal codebook, the rank R and the rank mapping index indicative of the columns deleted from the Kronecker product together with the derived CQI as the channel state information (CSI) back to the base station 200. Upon receiving the CSI, the base station 200 can derive the 3D codebook selected by the user equipment 100 from the $PMI_V$, the $PMI_H$, the R and the rank mapping indicator, and the user equipment 100 and the base station 200 can achieve the subsequent 3D MIMO communication with the same 3D codebook.

Figure 12:
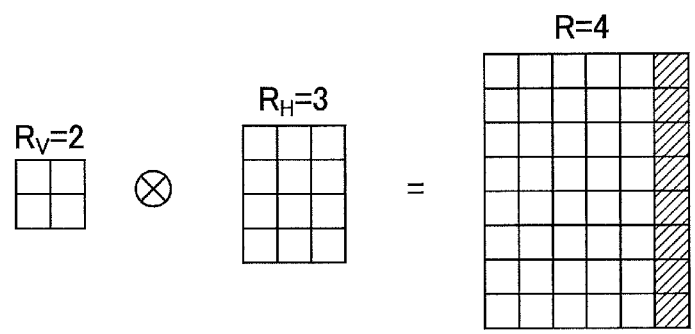
FIG. 12 is a diagram for illustrating exemplary generation of 3D codebooks according to one embodiment of the present invention.

In one embodiment, the rank mapping index may indicate that predetermined columns are deleted (for example, a manner of always deleting the columns sequentially from the last one), columns selected for deletion and/or columns selected for non-deletion. In the illustrated example, the columns for deletion in the Kronecker product are predetermined columns such as the last column in the matrix, but the present invention is not limited to them. For example, the columns for deletion or the column for non-deletion may be selected by the user equipment 100 or configured by the base station 200. For example, as illustrated in FIG. 12, the columns selected for deletion may be indicated, and/or the columns selected for non-deletion may be indicated. In the illustrated example, the last column in the Kronecker product is to be deleted, and combinations (1, 1), (2, 1), (1, 2), (2, 2) and (1, 3) of the vertical codebook and the horizontal codebook are selected for deletion while the combination (2, 3) is selected for non-deletion. Then, if the rank mapping index indicates the columns selected for non-deletion, the transmission and reception unit 110 feeds the combinations (1, 1), (2, 1), (1, 2), (2, 2) and (1, 3) back to the base station 200. On the other hand, the rank mapping index indicates the columns selected for deletion, the transmission and reception unit 110 feeds the combination (2, 3) back to the base station 200. Since the columns for deletion are generally smaller than the columns for non-deletion, it is considered that the rank mapping index indicative of the selected columns for deletion may be efficient with respect to an information amount.

Figure 13:
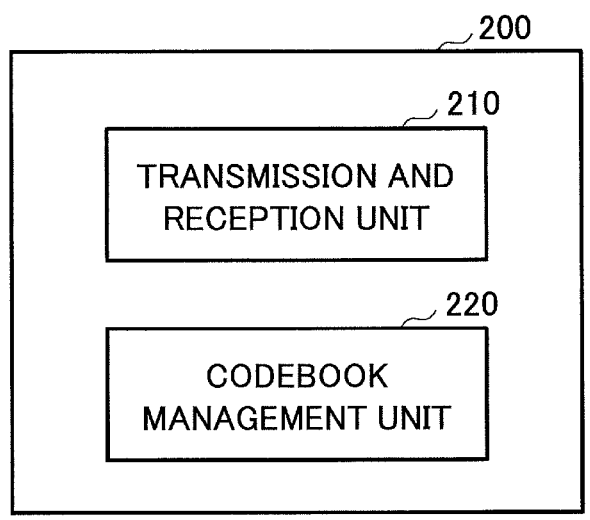
FIG. 13 is a block diagram for illustrating an arrangement of a base station according to one embodiment of the present invention.

Next, a base station according to one embodiment of the present invention is described with reference to FIG. 13. FIG. 13 is a block diagram for illustrating an arrangement of the base station according to one embodiment of the present invention.

As illustrated in FIG. 13, the base station 200 has a transmission and reception unit 210 and a codebook management unit 220.

The transmission and reception unit 210 transmits and receives radio signals to/from the user equipment 100 in 3D MIMO communication. Specifically, the transmission and reception unit 210 transmits reference signals (CSI-RSs) from multiple antenna ports to the user equipment 100 in the 3D MIMO communication and receives channel state information including a precoding matrix indicator (PMI), a rank indicator (RI) and a channel quality indicator (CQI) selected based on the reference signals as feedback information from the user equipment 100. The transmission and reception unit 210 performs the 3D MIMO communication based on the received channel state information.

The codebook management unit 220 has a first codebook and a second codebook and determines a 3D codebook for the 3D MIMO communication by combining the first codebook with the second codebook. In one embodiment, the first codebook is a vertical codebook for vertical precoding, and the second codebook is a horizontal codebook for horizontal precoding. The codebook management unit 220 may calculate a Kronecker product of the vertical codebook and the horizontal codebook based on the feedback information received from the user equipment 100 to determine the 3D codebook for the 3D MIMO communication from the calculated Kronecker product. Specifically, the codebook management unit 220 identifies the vertical codebook and the horizontal codebook selected by the user equipment 100 from the channel state information fed back from the user equipment 100, calculates the Kronecker product of the identified vertical and horizontal codebooks and identifies the calculated Kronecker product as the 3D codebook selected by the user equipment 100. Note that the first and second codebooks are not limited to the vertical and horizontal codebooks and may include a polarization direction of a cross polarization antenna. The codebook management unit 220 may generate the 3D codebook by combining any two or more of the vertical direction, the horizontal direction and the polarization direction. Also, operations to combine the two codebooks according to the present invention are not limited to the Kronecker product and may be any appropriate binary operation or matrix operation that can combine the two or more codebooks (matrices).

In one embodiment, the codebook management unit 220 may calculate the Kronecker product of the vertical codebook for rank $R_V$ and the horizontal codebook for rank $R_H$ to generate a 3D codebook for rank R equal to a product $(R_V \times R_H)$ of the rank $R_V$ and the rank $R_H$. Then, the transmission and reception unit 210 uses the generated 3D codebook to perform the 3D MIMO communication with the user equipment 100. In this manner, the user equipment 100 and the base station 200 can achieve the subsequent 3D MIMO communication with the same 3D codebook.

In other embodiments, the codebook management unit 220 may calculate the Kronecker product of the vertical codebook for rank $R_V$ and the horizontal codebook for rank $R_H$ to generate a 3D codebook for rank R smaller than or equal to a product $(R_V \times R_H)$ of the rank $R_V$ and the rank $R_H$ and calculate the 3D codebook for the rank R selected by the user equipment 100 by deleting one or more columns from the generated 3D codebook based on feedback information. Then, the transmission and reception unit 210 uses the 3D codebook for the rank R selected by the user equipment 100 to perform the 3D MIMO communication with the user equipment 100. In this manner, the user equipment 100 and the base station 200 can achieve the subsequent 3D MIMO communication with the same 3D codebook. Also, the 3D codebook for ranks that are not supported under the vertical codebook and the horizontal codebook can be obtained by combining the vertical codebook with the horizontal codebook.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-195886 filed on Sep. 25, 2014, the entire contents of which are hereby incorporated by reference.

LIST OF REFERENCE SYMBOLS

10: radio communication system
100: user equipment
200: base station

The invention claimed is:

1. A user equipment for implementing 3D MIMO (3-Dimensional Multiple-Input Multiple-Output) communication, comprising:
   a transceiver configured to transmit and receive radio signals to/from a base station in the 3D MIMO communication; and
   a processor configured to have a first codebook and a second codebook, wherein the processor determines a 3D codebook for the 3D MIMO communication by combining the first codebook with the second codebook, and the transceiver feeds the first codebook and the second codebook serving as a basis of calculating the determined 3D codebook back to the base station, wherein the processor calculates a Kronecker product of the first codebook for rank $R_V$ and the second codebook for rank $R_H$ to generate the 3D codebook for rank R, the rank R being smaller than or equal to a product ($R_V \times R_H$) of the rank $R_V$ and the rank $R_H$, and wherein when the rank R is smaller than the product ($R_V \times R_H$) of the rank $R_V$ and the rank $R_H$, the processor generates the 3D codebook by deleting a number of columns corresponding to a difference $\{(R_V \times R_H)-R\}$ from the calculated Kronecker product, and the transceiver feeds a rank mapping indicator that indicates the deleted columns back to the base station.

2. The user equipment as claimed in claim 1, wherein the first codebook is a vertical codebook for vertical precoding, and the second codebook is a horizontal codebook for horizontal precoding, and the processor calculates the Kronecker product of the vertical codebook and the horizontal codebook to determine the 3D codebook from the calculated Kronecker product.

3. The user equipment as claimed in claim 2, wherein the processor calculates the Kronecker product of the vertical codebook for rank $R_V$ and the horizontal codebook for rank $R_H$ to generate the 3D codebook for rank R, the rank R being equal to a product ($R_V \times R_H$) of the rank $R_V$ and the rank $R_H$.

4. The user equipment as claimed in claim 2, wherein the transceiver feeds a precoding matrix indicator and rank $R_V$ for the vertical codebook and a precoding matrix indicator and rank $R_H$ for the horizontal codebook serving as the basis of calculating the determined 3D codebook and a channel quality indicator derived from the 3D codebook back to the base station.

5. A base station for implementing 3D MIMO (3-Dimensional Multiple-Input Multiple-Output) communication, comprising:
a transceiver configured to transmit and receive radio signals to/from user equipment in 3D MIMO communication; and
a processor configured to have a first codebook and a second codebook,
wherein the processor determines a 3D codebook for the 3D MIMO communication by combining the first codebook with the second codebook based on feedback information received from the user equipment,
wherein the processor:
calculates a Kronecker product of the first codebook for rank $R_V$ and the second codebook for rank $R_H$ to generate the 3D codebook for rank R, the rank R being smaller than or equal to a product ($R_V \times R_H$) of the rank $R_V$ and the rank $R_H$; and
calculates the 3D codebook selected by the user equipment by deleting one or more columns from the generated 3D codebook based on the feedback information including a rank mapping indicator that indicates the deleted columns, and
wherein the transceiver uses the 3D codebook to perform the 3D MIMO communication with the user equipment.

6. The base station as claimed in claim 5, wherein the first codebook is a vertical codebook for vertical precoding, and the second codebook is a horizontal codebook for horizontal precoding, and the processor calculates the Kronecker product of the vertical codebook and the horizontal codebook to determine the 3D codebook from the calculated Kronecker product.

7. The base station as claimed in claim 6, wherein the processor calculates the Kronecker product of the vertical codebook for rank $R_V$ and the horizontal codebook for rank $R_H$ to generate the 3D codebook for rank R, the rank R being equal to a product ($R_V \times R_H$) of the rank $R_V$ and the rank $R_H$, and the transceiver uses the generated 3D codebook to perform the 3D MIMO communication with the user equipment.

8. The user equipment as claimed in claim 3, wherein the transceiver feeds a precoding matrix indicator and rank $R_V$ for the vertical codebook and a precoding matrix indicator and rank $R_H$ for the horizontal codebook serving as the basis of calculating the determined 3D codebook and a channel quality indicator derived from the 3D codebook back to the base station.

* * * * *